United States Patent
Kondoh et al.

(10) Patent No.: US 7,395,138 B2
(45) Date of Patent: Jul. 1, 2008

(54) DRIVING ASSIST SYSTEM FOR VEHICLE

(75) Inventors: Takayuki Kondoh, Yokosuka (JP); Tomohiro Yamamura, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 193 days.

(21) Appl. No.: 10/910,657

(22) Filed: Aug. 4, 2004

(65) Prior Publication Data

US 2005/0033517 A1 Feb. 10, 2005

(30) Foreign Application Priority Data

Aug. 8, 2003 (JP) .............................. 2003-290077

(51) Int. Cl.
*G06F 17/00* (2006.01)
*G05D 1/00* (2006.01)
*G08G 1/00* (2006.01)

(52) U.S. Cl. ................................ 701/1; 701/36; 701/65; 701/80; 701/301

(58) Field of Classification Search .................. 701/1, 701/23, 24, 36, 41, 48, 49, 65, 70, 78, 79, 701/80, 91, 93, 96, 300, 301
See application file for complete search history.

(56) References Cited

U.S. PATENT DOCUMENTS

| | | | |
|---|---|---|---|
| 5,357,438 A * | 10/1994 | Davidian ................... 701/301 | |
| 5,902,345 A | 5/1999 | Minowa et al. | |
| 6,059,068 A | 5/2000 | Kato et al. | |
| 6,226,571 B1 | 5/2001 | Kai | |
| 6,405,132 B1 * | 6/2002 | Breed et al. ................ 701/301 | |
| 6,445,809 B1 | 9/2002 | Sasaki et al. | |
| 6,535,114 B1 | 3/2003 | Suzuki et al. | |
| 6,542,793 B2 | 4/2003 | Kojima et al. | |
| 6,559,762 B1 | 5/2003 | Tarabishy et al. | |
| 6,675,096 B2 | 1/2004 | Matsuura | |
| 6,721,659 B2 | 4/2004 | Stopczynski | |

(Continued)

FOREIGN PATENT DOCUMENTS

DE 42 16 764 A1 11/1993

(Continued)

OTHER PUBLICATIONS

U.S. Appl. No. 10/226,232.

(Continued)

*Primary Examiner*—Jack Keith
*Assistant Examiner*—Edward Pipala
(74) *Attorney, Agent, or Firm*—McDermott Will & Emery LLP

(57) ABSTRACT

A driving assist system for vehicle comprises a state recognition device that detects vehicle conditions of a subject vehicle and a traveling environment for vehicle surroundings; a risk potential calculator that calculates a risk potential for vehicle surroundings based on detection results of the state recognition device; a risk change estimator that estimates change in risk felt by a driver; a correction device that corrects a calculation equation for calculating the risk potential at the risk potential calculator based on estimation results of the risk change estimator; and an operation reaction force controller that controls operation reaction force generated at a vehicle operation equipment based on the risk potential calculated using the calculation equation corrected by the correction device.

21 Claims, 10 Drawing Sheets

U.S. PATENT DOCUMENTS

| | | |
|---|---|---|
| 6,785,611 B2 * | 8/2004 | Ibrahim .................. 701/301 |
| 6,850,629 B2 | 2/2005 | Jeon |
| 7,072,764 B2 | 7/2006 | Donath et al. |
| 7,124,010 B2 | 10/2006 | Egami |
| 2001/0003810 A1 | 6/2001 | Shinmura et al. |
| 2001/0041959 A1 | 11/2001 | Satou et al. |
| 2002/0013652 A1 | 1/2002 | Yasui et al. |
| 2002/0045981 A1 | 4/2002 | Ichikawa et al. |
| 2003/0045982 A1 | 3/2003 | Kondo et al. |
| 2003/0191568 A1 * | 10/2003 | Breed ..................... 701/36 |
| 2004/0249549 A1 * | 12/2004 | Kondoh et al. ............ 701/96 |
| 2005/0065687 A1 * | 3/2005 | Hijikata et al. ........... 701/41 |
| 2005/0090984 A1 * | 4/2005 | Kobayashi et al. ........ 701/301 |
| 2005/0143893 A1 * | 6/2005 | Takamatsu et al. ........ 701/91 |

FOREIGN PATENT DOCUMENTS

| | | | |
|---|---|---|---|
| DE | 19821163 | A1 | 11/1999 |
| DE | 101 32 386 | A1 | 1/2003 |
| EP | 0718173 | A2 | 6/1996 |
| EP | 1 045 121 | A2 | 10/2000 |
| JP | 3-260900 | A | 11/1991 |
| JP | 05-231194 | | 9/1993 |
| JP | 7-149193 | A | 6/1995 |
| JP | 9-132093 | A | 5/1997 |
| JP | 10-166889 | A | 6/1998 |
| JP | 10-166890 | A | 6/1998 |
| JP | 10-194151 | A | 7/1998 |
| JP | 10-211886 | A | 8/1998 |
| JP | 11-029060 | | 2/1999 |
| JP | 11-39597 | A | 2/1999 |
| JP | 2000-52809 | A | 2/2000 |
| JP | 2000-54860 | A | 2/2000 |
| JP | 2000-67393 | A | 3/2000 |
| JP | 2001-151137 | A | 6/2001 |
| JP | 2002-019485 | A | 1/2002 |
| JP | 2003-81039 | A | 3/2003 |
| WO | WO 01/89897 | A1 | 11/2001 |
| WO | WO 03-064237 | A1 | 8/2003 |

OTHER PUBLICATIONS

U.S. Appl. No. 10/336,802.

U.S. Appl. No. 10/656,173.

\* cited by examiner $x_1$     $d = x_2 - x_1$     $x_2$ $v_1$     $v_r = v_2 - v_1$     $v_2$ $a_1$     $a_r = a_2 - a_1$     $a_2$ $THW = d/v_1$     $TTC = -d/v_r$

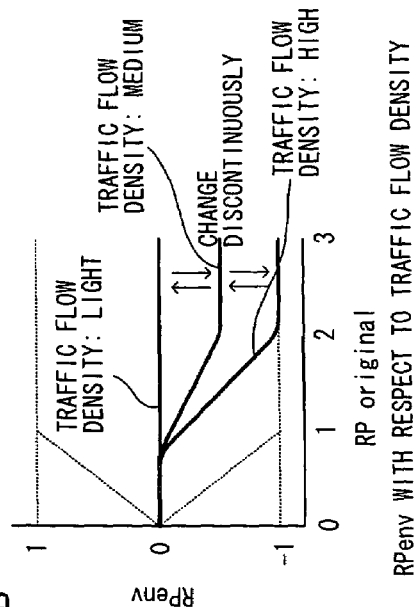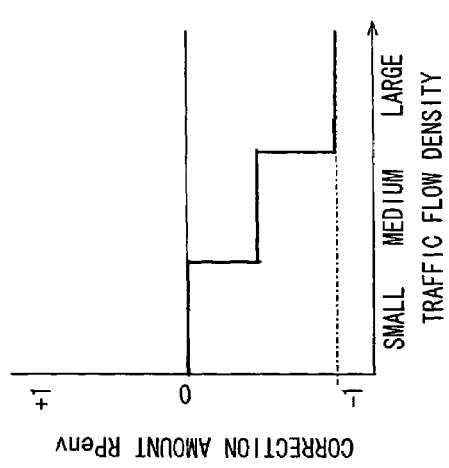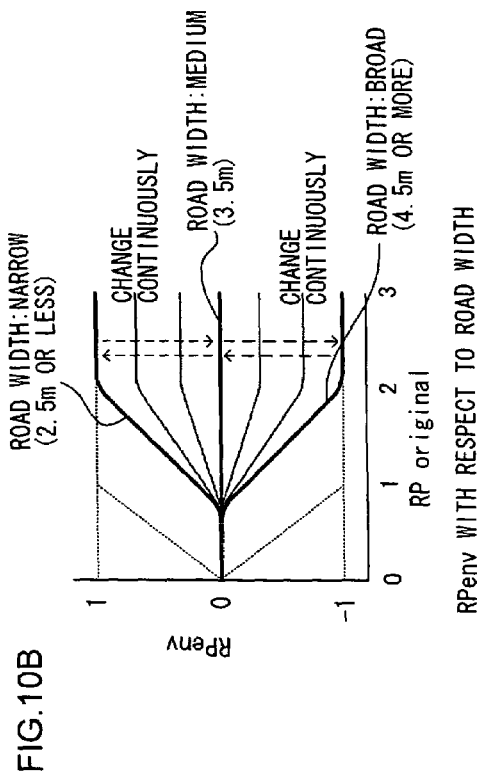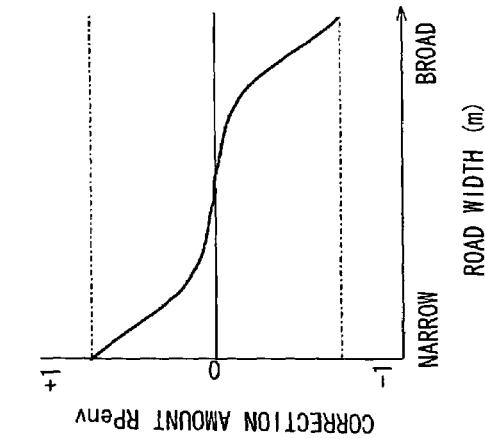

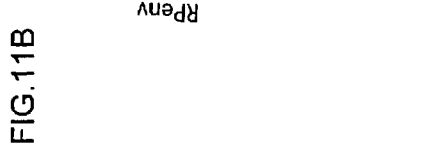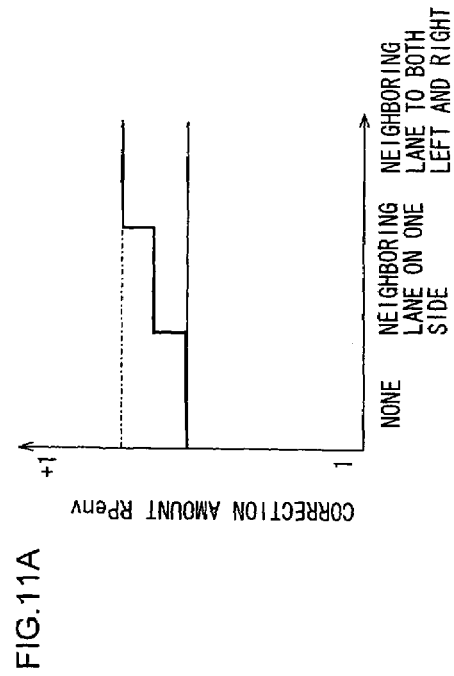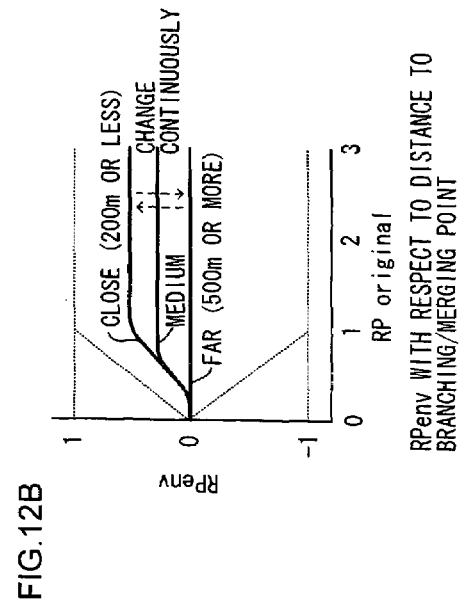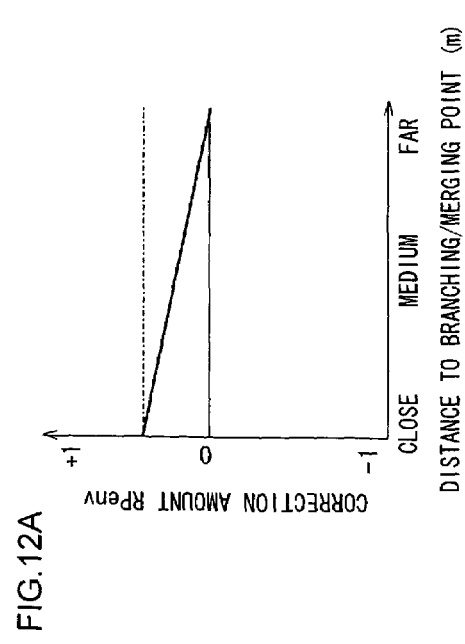
FIG.11A
FIG.11B
FIG.12A
FIG.12B

DRIVING ASSIST SYSTEM FOR VEHICLE

BACKGROUND OF THE INVENTION

1. Field of the Invention

The present invention relates to a drive operation assist system for a vehicle, for assisting operations carried out by a driver.

2. Description of Related Art

Systems that assist driver operations include the system disclosed in Japanese Laid-open Patent Publication No. H10-166889. This system changes operation reaction force of an accelerator pedal based on inter-vehicle distance between a preceding vehicle and a subject vehicle. Warning is given to a driver by increasing reaction force of the acceleration pedal as the distance between vehicles decreases.

SUMMARY OF THE INVENTION

It is desirable to carry out reaction force control in line with risk felt by a driver to take into consideration changes in risk felt by the driver due to changes in the traveling environment of the vehicle surroundings for this kind of driving assist system for vehicle.

A driving assist system for vehicle according to the present invention comprises: a state recognition device that detects vehicle conditions of a subject vehicle and a traveling environment for vehicle surroundings; a risk potential calculator that calculates a risk potential for vehicle surroundings based on detection results of the state recognition device; a risk change estimator that estimates change in risk felt by a driver; a correction device that corrects a calculation equation for calculating the risk potential at the risk potential calculator based on estimation results of the risk change estimator; and an operation reaction force controller that controls operation reaction force generated at a vehicle operation equipment based on the risk potential calculated using the calculation equation corrected by the correction device.

A driving assist system for vehicle according to the present invention comprises: a state recognition means for detecting vehicle conditions of a subject vehicle and a traveling environment for vehicle surroundings; a risk potential calculation means for calculating a risk potential for vehicle surroundings based on detection results of the state recognition means; a risk change estimating means for estimating change in risk felt by a driver; a correction means for correcting a calculation equation for calculating the risk potential at the risk potential calculation means based on estimation results of the risk change estimating means; and an operation reaction force control means for controlling operation reaction force generated at a vehicle operation equipment based on the risk potential calculated using the calculation equation corrected by the correction means.

A vehicle driving assist method according to the present invention detects vehicle conditions of a subject vehicle and a traveling environment for vehicle surroundings; calculates a risk potential for vehicle surroundings based on the vehicle conditions and the traveling environment thus detected; estimates change in risk felt by a driver; corrects a calculation equation for calculating the risk potential based on the estimated change in the risk felt by the driver; and controls operation reaction force generated at a vehicle operation equipment based on the risk potential calculated using the calculation equation thus corrected.

A vehicle according to the present invention comprises a driving assist system for vehicle that comprises (a) a state recognition device that detects vehicle conditions of a subject vehicle and a traveling environment for vehicle surroundings; (b) a risk potential calculator that calculates a risk potential for vehicle surroundings based on detection results of the state recognition device; (c) a risk change estimator that estimates change in risk felt by a driver; (d) a correction device that corrects a calculation equation for calculating the risk potential at the risk potential calculator based on estimation results of the risk change estimator; and (e) an operation reaction force controller that controls operation reaction force generated at a vehicle operation equipment based on the risk potential calculated using the calculation equation corrected by the correction device.

BRIEF DESCRIPTION OF THE DRAWINGS

FIG. 9A is a view showing a relationship between a traffic flow density and a correction value, and FIG. 9B is a view showing a relationship between an initial risk potential and a correction value.

FIG. 10A is a view showing a relationship between road width and a correction value, and FIG. 10B is a view showing the relationship between an initial risk potential and a correction value.

FIG. 11A is a view showing a relationship between the presence or absence of a neighboring lane and a correction value, and FIG. 11B is a view showing a relationship between an initial risk potential and a correction value.

FIG. 12A is a view showing a relationship between a distance to a branching/merging point and a correction value, and FIG. 12B is a view showing a relationship between an initial risk potential and a correction value.

DESCRIPTION OF THE PREFERRED EMBODIMENTS

First Embodiment

Figure 1:
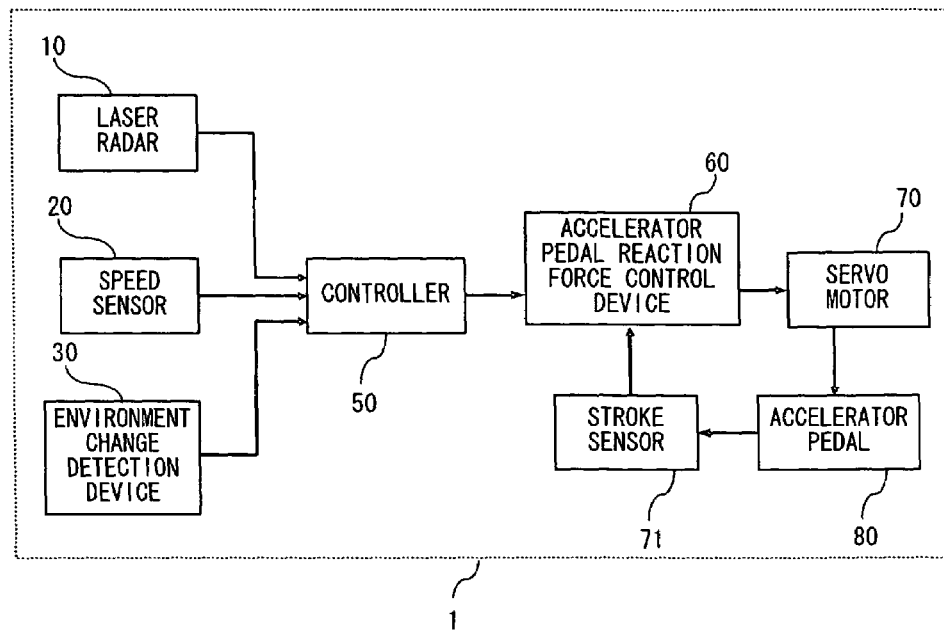
FIG. 1 is a system view of a driving assist system for vehicle of a first embodiment of the present invention.
Figure 2:
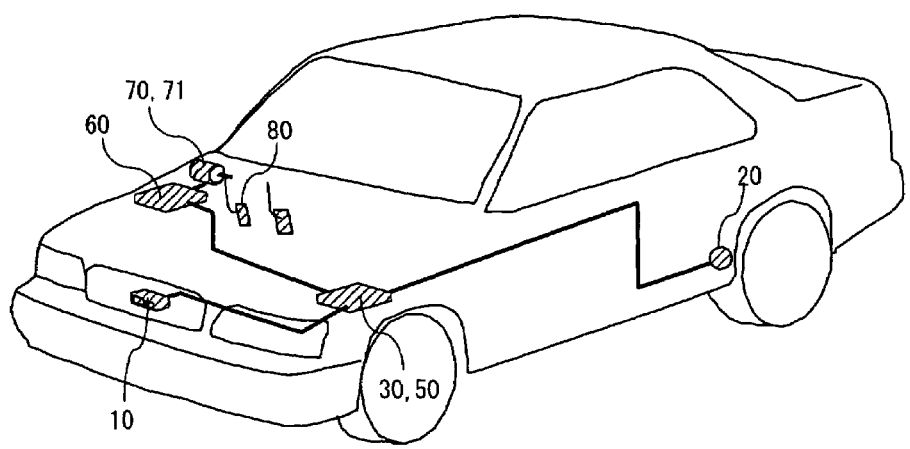
FIG. 2 is a structural drawing of a vehicle fitted with the driving assist system for vehicle shown in FIG. 1.

FIG. 1 is a system drawing showing a structure of a driving assist system for vehicle 1 according to the first embodiment of the present invention, and FIG. 2 is a structural drawing of a vehicle fitted with the driving assist system for vehicle 1.

First of all the structure of the driving assist system for vehicle 1 will be described. A laser radar 10 is attached to a front grill section of a vehicle or to a bumper etc., and irradiates infrared light pulses in a horizontal direction so as to scan the region ahead of the vehicle. The laser radar 10 measures reflected waves of infrared light pulses reflected by a plurality of reflecting objects ahead (normally the rear of a preceding vehicle), and detects a distance from the subject vehicle to the preceding vehicle and a relative velocity of vehicles based upon the time it takes reflected waves to be received. The detected distance between vehicles and relative velocity are output to a controller 50. The forward region scanned by the laser radar 10 is about 6 degrees each side of an axis parallel to the vehicle longitudinal centerline. Objects existing within this range cane be detected.

A vehicle speed sensor 20 detects a traveling speed of the vehicle by measuring rotational speed of wheels or rotational speed of the output shaft of a transmission and outputs the detected vehicle speed to the controller 50.

An environment change detection device 30 detects a traveling environment of vehicle surroundings and outputs information relating to detected traveling environment to the controller 50. In the first embodiment, the environment change detection device 30 has, for example, a front camera comprised of a CCD etc. for taking images of a region in front of the vehicle, and detects an illumination state of brake lamps of the preceding vehicle as traveling conditions for vehicle surroundings.

The controller 50 comprises a CPU and CPU peripheral devices, such as ROM, RAM etc., and performs overall control of the driving assist system for vehicle 1. The controller 50 calculates a risk potential for vehicle surroundings based upon signals such as the vehicle speed, distance between vehicles and relative velocity input from the vehicle speed sensor 20 and the laser radar 10. In addition, changes in risk felt by a driver due to changes in traveling environment of vehicle surroundings is estimated according to changes in the environment surrounding the vehicle detected by the environment change detection device 30 so as to correct the risk potential. Further, a reaction force command value is outputted to an accelerator pedal reaction force control device 60 in order to carry out accelerator pedal reaction force control based on the calculated risk potential. Risk potential calculation and accelerator pedal reaction force control by the controller 50 will be described in detail later.

Figure 3:
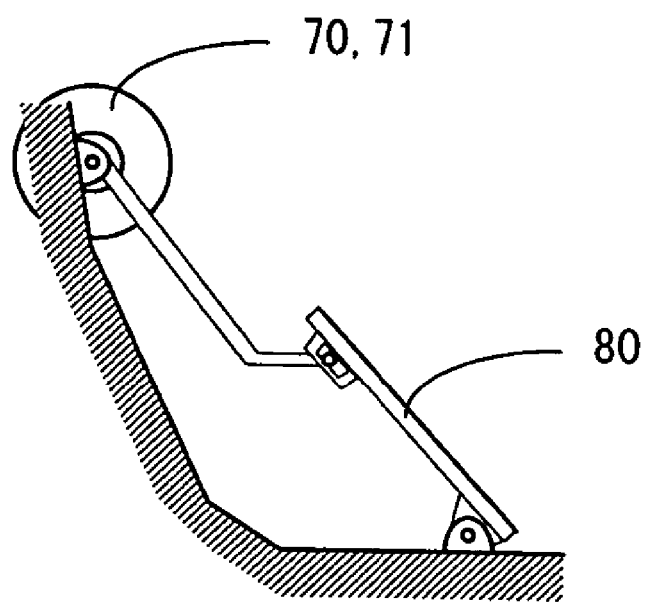
FIG. 3 is a structural drawing of an accelerator pedal and its surroundings.

The accelerator pedal reaction force controlling device 60 controls accelerator pedal operation reaction force in response to the instruction value from the controller 50. As shown in FIG. 3, a servo motor 70 and an accelerator pedal stroke sensor 71 are connected to an accelerator pedal 80 via a link mechanism. The servo motor 70 controls torque and rotation angle thereof in response to a command from the accelerator pedal reaction force control device 60, and thus operation reaction force generated when the driver operates the accelerator pedal 80 can be controlled as desired. The accelerator pedal stroke sensor 71 detects an operation amount S by which the driver depresses the accelerator pedal 80 which is converted to rotation angle of the servo motor 70 via a link mechanism.

Figure 8:
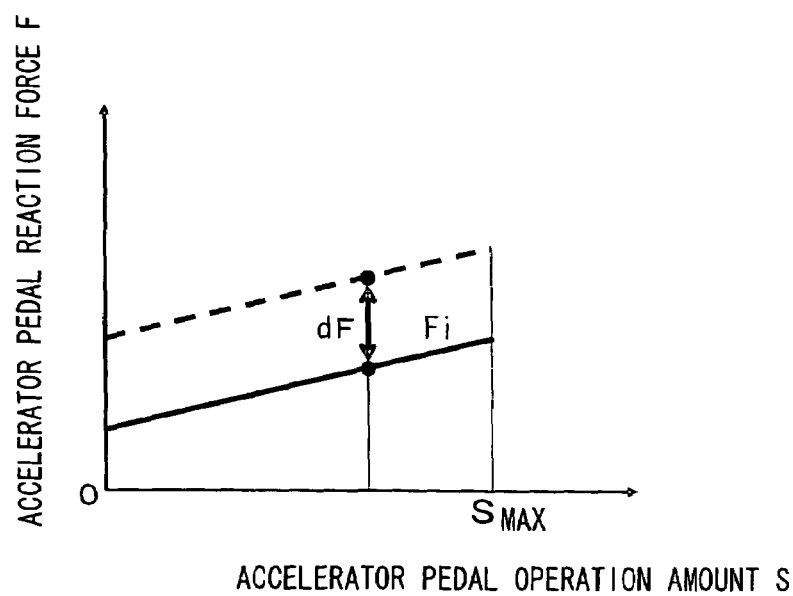
FIG. 8 is a drawing showing a characteristic of acceleration pedal reaction force versus acceleration pedal stroke amount.

A normal accelerator pedal reaction force characteristic Fi when control of accelerator pedal reaction force is not carried out is set so that, for example, reaction force of the accelerator pedal 80 becomes larger in a linear manner as the operation amount S becomes larger (refer to FIG. 8). The normal accelerator pedal reaction force characteristic Fi can be implemented, for example, using spring force of a torsion spring (not shown in the drawings) provided at the center of rotation of the accelerator pedal 80.

Next, a description is given of the operation of the driving assist system for vehicle 1 according to the first embodiment of the present invention. First, an outline is described below.

The controller 50 calculates a risk potential RP for the vehicle surroundings based on the vehicle conditions and traveling environment surrounding the vehicle. An operation reaction force F is generated at the accelerator pedal 80 according to the calculated risk potential RP. Here, it is desirable to transmit risk actually felt by the driver to the driver as an acceleration pedal reaction force F when performing acceleration pedal reaction force control based on the risk potential RP of the vehicle surroundings.

Risk actually felt or perceived by the driver when traveling changes depending on the traveling conditions for the vehicle surroundings. For example, even when the relative velocity vr and inter-vehicle distance d between a subject vehicle and a preceding vehicle are the same at a certain time, the driver feels differing risk in the case where the subject vehicle follows the preceding vehicle with the relative velocity vr at zero and with the inter-vehicle distanced fixed, i.e. in a steady state, and in the case where the relative velocity vr and the inter-vehicle distance d change so that the subject vehicle approaches the preceding vehicle, i.e. in a transient state. Further, risk felt by the driver (driver's feeling or perception of risk) also changes according to environmental changes in the vehicle surroundings.

In the first embodiment, risk assuming that the traveling conditions for the vehicle surroundings are in the steady state and risk assuming that the traveling conditions are in the transient state are defined individually, and risk potential is calculated in line with the perception of the driver. Moreover, changes in risk felt by the driver due to changes in the environment surrounding the vehicle are estimated, and risk potential is corrected according to changes in risk felt by the driver.

Figure 4:
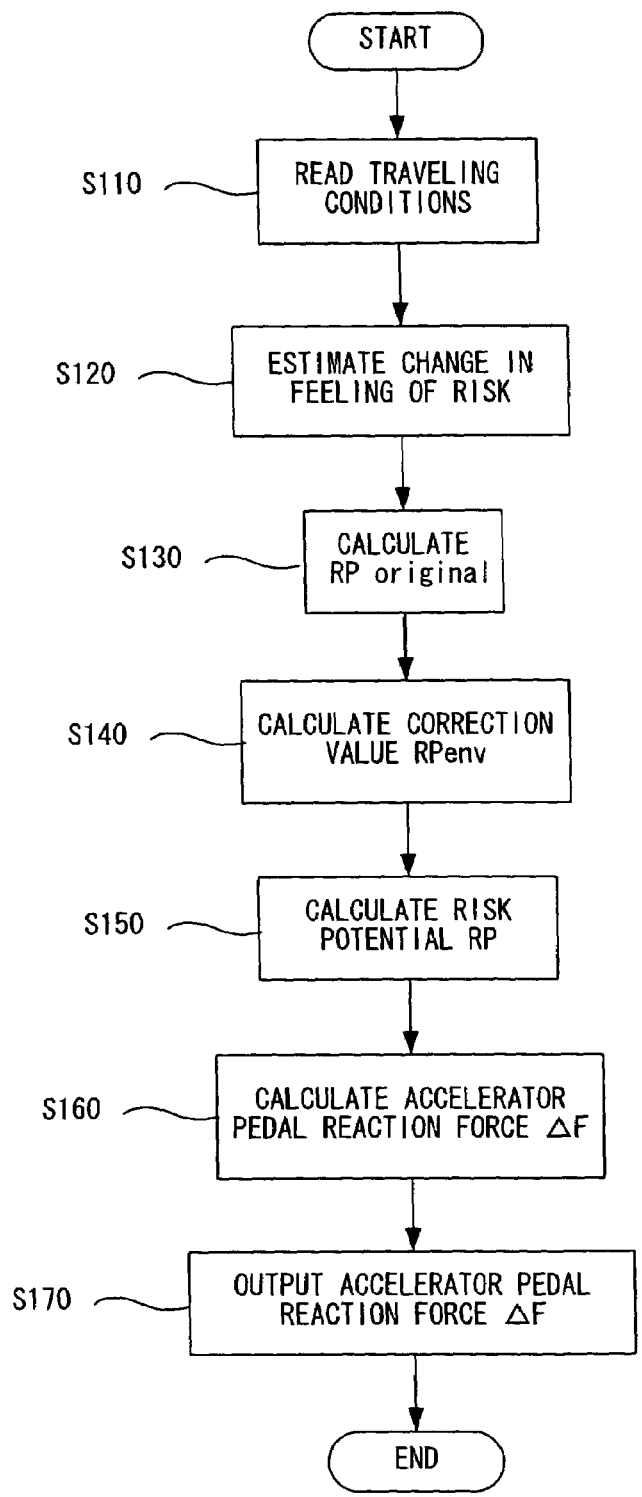
FIG. 4 is flow chart showing a processing sequence for a drive operation assist control program executed in a controller of the first embodiment.

The following is a detailed description using FIG. 4 of operations of the driving assist system for vehicle 1 of the first embodiment. FIG. 4 is a flowchart showing a processing sequence for a drive operation assist control program in the controller 50. The content of this processing is carried out continuously at fixed intervals (for example, 50 msecs).

Figure 5:
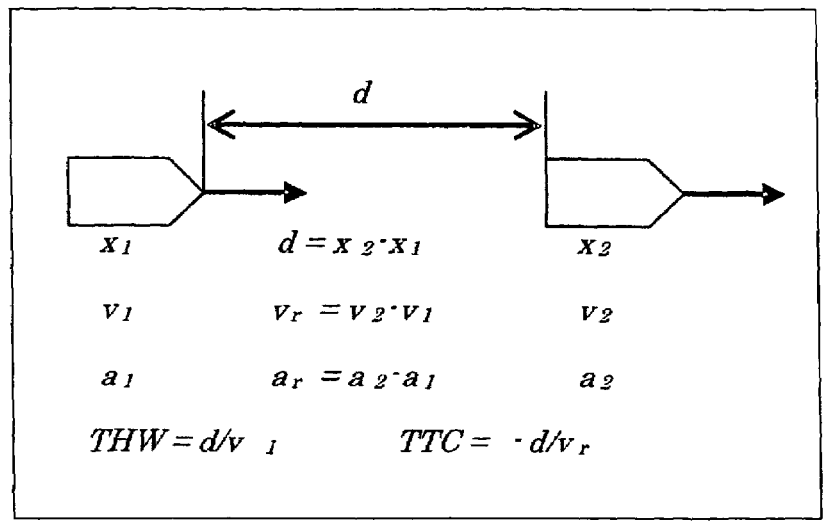
FIG. 5 is a schematic drawing showing traveling conditions of a subject vehicle and a preceding vehicle.

In step S110, running conditions of the vehicle and the vehicle surroundings are read in from the laser radar 10 and the vehicle speed sensor 20. Running conditions of the vehicle and a preceding vehicle are schematically shown in FIG. 5. Parameters representing running conditions of the vehicle are current position $x1$ of the vehicle in the longitudinal direction of the vehicle, vehicle speed $v1$, and vehicle acceleration $a1$. Parameters representing running conditions of the preceding vehicle are current position $x2$ of the preceding vehicle in the longitudinal direction of the vehicle, preceding vehicle speed $v2$ and preceding vehicle acceleration $a2$. A distance d between the vehicle and the preceding vehicle is d=x2−x1, with relative velocity vr=v2−v1, and relative acceleration ar=a2−a1.

In step S120, changes in risk felt by a driver due to changes in the environment of the vehicle surroundings are estimated. Here, in order to estimate changes in risk felt by a driver, a brake lamp illumination state of the preceding vehicle is detected as traveling conditions. Specifically, the controller 50 subjects images of the region to the front of the vehicle inputted by the front camera 30 to image processing, and detects whether the brake lamps of the preceding vehicle are lit-up or turned off. When the brake lamps of the preceding vehicle are lit up, the driver predicts that the preceding vehicle is to decelerate, and it can be assumed that the risk felt by the driver with respect to the vehicle surroundings will increase.

In step S130, a risk potential (steady term) RPsteady expressing risk in the case where traveling conditions for the vehicle surroundings are in a steady state and a risk potential (transient term) RPtransient expressing risk in the case of a transient state are calculated. Then, a risk potential RP for the vehicle surroundings is calculated. In order to calculate the steady term RPsteady and the transient term RPtransient, first, time to contact (TTC) and time headway (THW) for the preceding vehicle are calculated.

TTC is a physical quantity representing current degree of closeness of the vehicle to a preceding vehicle. In the case where current running conditions are continuous, that is, when vehicle speed v1, preceding vehicle speed v2 and relative speed vr are constant, TTC is a value representing how many seconds later the distance between vehicles d will become zero and the vehicle and the preceding vehicle come into contact with each other. TTC can be obtained from the following (equation 1).

$$TTC = -d/vr \quad \text{(equation 1)}$$

As the value of TTC becomes smaller, contact with the preceding vehicle is strained, which means that degree of closeness to the preceding vehicle is large. For example, when the subject vehicle is approaching the preceding vehicle, before TTC becomes four seconds or less it is known that almost all drivers will start a deceleration operation.

THW is a physical quantity representing predicted degree of influence on TTC due to variation in speed of a preceding vehicle assuming that the subject vehicle is following the preceding vehicle, namely degree of influence when it is assumed that relative velocity vr changes. THW is represented by the following (equation 2).

$$THW = d/v1 \quad \text{(equation 2)}$$

THW is a value obtained by dividing the distance between vehicles d by the vehicle speed v1, and represents a time until the vehicle reaches the current position of the preceding vehicle. As this THW becomes larger, the predicted degree of influence for changes in surrounding environment becomes smaller. That is, if THW is large, there is not a lot of influence on the degree of closeness to the preceding vehicle even if the preceding vehicle speed changes in the future, representing that TTC does not vary a great deal. In the event that the subject vehicle follows the preceding vehicle and the vehicle speed v1=the preceding vehicle speed v2, then by substituting preceding vehicle speed v2 for vehicle speed v1 in (equation 2) it is possible to calculate THW.

The steady term RPsteady and the transient term RPtransient can be expressed using (equation 3) and (equation 4) in the following using the THW calculated from (equation 2) and the TTC calculated from (equation 1).

$$RPsteady = 1/THW \quad \text{(equation 3)}$$

$$RPtransient = 1/TTC \quad \text{(equation 4)}$$

Further, the risk potential RP with respect to the preceding vehicle is calculated using the calculated steady term RPsteady and transient term RPtransient. Risk potential calculated from the steady term RPsteady and the transient term RPtransient is expressed hereafter as initial risk potential RPoriginal. The initial risk potential RPoriginal is a risk potential value for prior to carrying out correction according to changes in feeling of risk felt by the driver.

The initial risk potential RPoriginal with respect to the preceding vehicle can be calculated using the following (equation 5).

$$RPoriginal = A \cdot RPsteady + B \cdot Rtransient \quad \text{(equation 5)}$$

Here, A and B are constants for providing appropriate weightings to the steady term RPsteady and the transient term RPtransient and are values set appropriately in advance. The constants A and B are set, for example, to A=1, B=8 (A<B).

Next, in step S140, a correction value RPenv is calculated for correcting the initial risk potential RPoriginal calculated in step S130 according to changes in the risk felt by the driver due to changes in the environment. Specifically, the correction value RPenv is calculated based on the state of illumination of the brake lamps of the preceding vehicle detected in step S120 and the initial risk potential RPoriginal calculated in step S130.

Figure 6A:
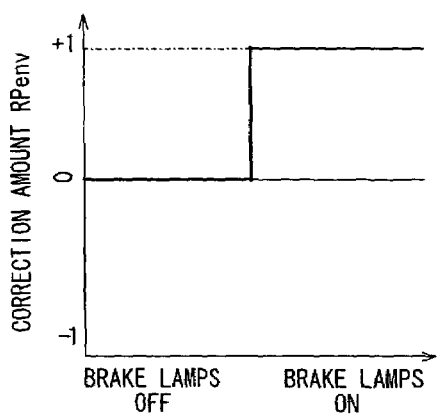
FIG. 6A is a view showing a relationship between a brake lamp illumination state and a correction value.
Figure 6B:
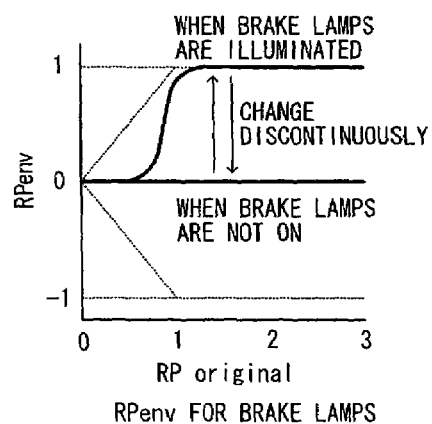
FIG. 6B is a view showing a relationship between an initial risk potential and a correction value.

A relationship between the state of illumination of the brake lamps of the preceding vehicle and the correction value RPenv are shown in FIG. 6A, and a relationship between the initial risk potential RPoriginal and the correction value RPenv corresponding to FIG. 6A are shown in FIG. 6B. As shown in FIG. 6A and FIG. 6B, when the brake lamp is not lit, the correction value RPenv is taken to be =0. On the other hand, when the brake lamps are illuminated, the correction value RPenv is taken to be zero in regions where the initial risk potential RPoriginal is extremely small, with correction value RPenv being made larger for larger values of the initial risk potential RP original ($0 \leq RPenv \leq 1$). When the lit state of the brake lamps of the leading vehicle changes, the correction value RPenv changes in a discontinuous manner. For example, when the brake lamps of the preceding vehicle are turned on while the initial risk potential RPoriginal is large, the correction value RPenv is changed immediately from 0 to 1.

In step S150, risk potential RP with respect to the preceding vehicle is calculated from initial risk potential RPoriginal calculated in step S130 and the correction value RPenv in accordance with change in environment calculated in step S140. The risk potential RP is calculated using (equation 6) below.

$$\begin{aligned} RP &= RP\,original + RP\,env \\ &= A \cdot RP\,steady + B \cdot RP\,transient + RP\,env \end{aligned} \quad \text{(equation 6)}$$

The risk potential RP calculated in (equation 6) can be said to be a value that is obtained by correcting the risk potential calculated based on the vehicle state and traveling environment of the vehicle according to change in the risk felt by the driver due to environmental changes.

Figure 7:
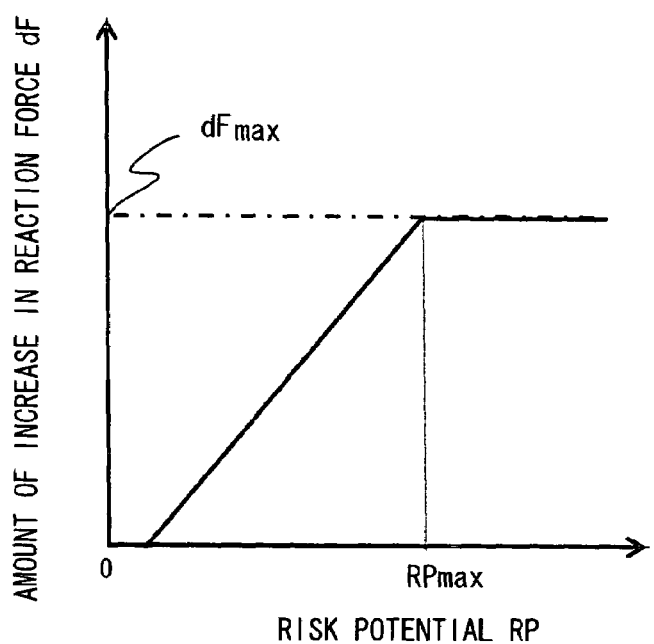
FIG. 7 is a view showing a relationship between a risk potential and an extent of increase in reaction force.

In step S160, an accelerator pedal reaction force increase amount dF is calculated based on the risk potential RP calculated in step S150. FIG. 7 shows a relationship between risk potential RP and accelerator pedal reaction force increase amount dF. As shown in FIG. 7, the accelerator pedal reaction force increase amount dF increases as the risk potential RP becomes larger. When the risk potential RP exceeds the maximum value RPmax, the amount of increase in reaction force dF is fixed at the maximum value dFmax. Namely, even when the risk potential RP corrected according to the state of illumination of the brake lamps of the preceding vehicle exceeds the maximum value RPmax, the amount of increase in reaction force dF actually applied to the accelerator pedal 80 is restricted to being the maximum value dFmax.

As a result, up until the risk potential RP reaches the maximum value RPmax, the risk potential RP for the vehicle surroundings is transmitted or conveyed to the driver using accelerator pedal reaction force. When conditions are then such that the risk potential RP exceeds the maximum value RPmax, increase in the accelerator pedal reaction force increase amount dF is restricted, and vehicle operations such as overtaking etc. can be carried out as the driver intends. The risk potential value RPmax is taken to be, for example, RPmax=3. This value corresponds approximately to the risk potential RP when the correction value RPenv=0, TWH=0.3, and TTC=0. FIG. 6B shows the change in the correction value RPenv when the initial risk potential RPoriginal changes from 0 to 3.

Next, in step S170, the reaction force increase amount dF calculated in step S160 is output to the accelerator pedal reaction force control device 60. The accelerator pedal reaction force control device 60 controls the servo motor 70 so as to generate accelerator pedal reaction force F that is the reaction force increase amount dF added to the normal reaction force characteristic Fi, in response to a command from the controller 50, as shown in FIG. 8. This terminates the processing for this time.

In the first embodiment described above, the following operational effects can be achieved.

(1) The controller 50 calculates the risk potential RP for the vehicle surroundings based on the vehicle conditions and traveling environment surrounding the vehicle. The controller 50 estimates change in risk felt by the driver, and corrects a calculation equation for the risk potential based on change in the feeling of risk thus estimated. The controller 50 calculates the amount of increase in reaction force dF based on the risk potential RP calculated using the corrected calculation equation, and controls operation reaction force to be generated at a vehicle operation equipment, specifically, the accelerator pedal 80. As a result, the risk potential RP can be calculated coupled with the estimated changes in risk felt by the driver, and accelerator pedal reaction force can be controlled inline with the risk actually felt by the driver.

(2) The controller 50 estimates change in risk felt by the driver due to environmental change and the calculation equation or method for calculating the risk potential RP is corrected accordingly. The risk potential RP can therefore be calculated in line with the risk felt by the driver.

(3) The environment change detection device 30 detects the state of illumination of the brake lamps of the preceding vehicle as environmental changes. The driver predicts future risk from the state of illumination of the brake lamps of the preceding vehicle. It is therefore possible to calculate the risk potential RP in line with the risk felt by the driver by correcting the calculation equation for the risk potential according to the state of illumination of the brake lamps.

(4) The controller 50 calculates the correction value RPenv based on the state of illumination of the brake lamps of the preceding vehicle detected by the environment change detection device 30 and corrects the calculating equation for the risk potential RP by adding the calculated correction value RPenv. It is therefore possible to calculate the risk potential RP that is much closer to the risk felt by the driver by adding a correction value RPenv corresponding to the subjectivity of the driver to the initial risk potential RPoriginal calculated from the traveling conditions, such as the relative positional relationship with the preceding vehicle, etc.

(5) As shown in FIG. 6B, the correction value RPenv changes according to the initial risk potential RPoriginal and is always set to be smaller than the initial risk potential RPoriginal. As a result, it is straightforward for the driver to understand what is taken as the main target in calculating the risk potential RP.

Second Embodiment

The following is a description of a driving assist system for vehicle of a second embodiment of the present invention. The configuration for the driving assist system for vehicle of the second embodiment is the same as for the first embodiment shown in FIG. 1 and FIG. 2. Description here will mainly focus on points of difference from the first embodiment.

In the second embodiment, traffic flow density of the vehicle surroundings is detected as the traveling conditions in order to estimate change in risk felt by the driver. Here, as the environment change detection device 30, for example, a navigation system is used. The environment change detection device 30 acquires the VICS information, and detects a traffic flow density of the vehicle surroundings. The traffic flow density expresses the number of vehicles traveling at a certain spot per unit time. When the traffic flow density is high, the distance between each vehicle is typically short. When the traffic flow density is high, and in particular in the case of congestion, the driver accepts traveling with a short inter-vehicle distance. Accordingly, and it can be estimated that the risk perceived by the driver will be low compared with the case where the traffic flow density is low even when the inter-vehicle distance is short. The controller 50 calculates the correction value RPenv based on the traffic flow density and the initial risk potential RPoriginal calculated using (equation 5) described above.

A relationship between the traffic flow density and the correction value RPenv is shown in FIG. 9A, and a relationship between the initial risk potential RPoriginal and the correction value PRenv corresponding to FIG. 9A is shown in FIG. 9B. As shown in FIG. 9A and FIG. 9B, the traffic flow density is classified into three levels of high, medium and light, with the correction value RPenv set according to the initial risk potential RPoriginal for respective traffic flow densities. When the traffic flow density is light, the correction value RPenv is taken to be 0 regardless of the initial risk potential RPoriginal. When the traffic flow density changes from small to medium, and to large, the correction value RPenv is taken to be progressively smaller. When the traffic flow density is medium or high, the correction values RPenv are respectively made smaller for larger values of the initial risk potential RPoriginal. When the traffic flow density is high, the correction value RPenv is changed between $-1 \leq RPenv \leq 0$. Threshold values for classifying the traffic flow density into three levels are set in advance to appropriate values.

The controller 50 calculates risk potential RP with respect to the preceding vehicle based on the correction value RPenv calculated according to changes in the environment, i.e. according to traffic flow density, and the initial risk potential RP using (Equation 6).

As described above in the second embodiment, the following operational effects are also obtained in addition to the results for the first embodiment described above.

(1) The environment change detection device 30 detects the traffic flow density as changes in the environment. It goes without saying that inter-vehicle distance etc. is short for congested roads and that risk felt by the driver with respect to distance between vehicles changes according to the traffic flow density. It is therefore possible to calculate risk potential RP in line with the risk felt by the driver by correcting the equation for calculating the risk potential RP according to the traffic flow density.

(2) The controller 50 calculates the correction value RPenv based on the traffic flow density detected by the environment change detection device 30 and corrects the equation for calculating the risk potential RP by adding the calculated correction value RPenv. It is therefore possible to calculate risk potential RP that is much closer to the risk felt by the driver by adding a correction value RPenv corresponding to the subjectivity of the driver to the initial risk potential RPoriginal calculated from the traveling conditions, such as the relative positional relationship with the preceding vehicle, etc.

(3) As shown in FIG. 9B, the correction value RPenv changes according to the initial risk potential RPoriginal and is always set to be smaller than the initial risk potential RPoriginal. As a result, it is straightforward for the driver to understand what is taken as the main target in calculating the risk potential RP.

Third Embodiment

The following is a description of a driving assist system for vehicle of a third embodiment of the present invention. The configuration for the driving assist system for vehicle of the third embodiment is the same as for the first embodiment shown in FIG. 1 and FIG. 2. Description here will mainly focus on points of difference from the first embodiment.

In the third embodiment, a road width of the vehicle lane is detected as the traveling conditions in order to estimate change in risk felt by the driver. Here, the environment change detection device 30 recognizes lane markers by using roadmap information obtained from, for example, a navigation system or by subjecting images for the region in front of the vehicle obtained by the front camera to image processing. It is assumed that the driver feels a higher degree of risk as the road width narrows, and conversely feels a lower degree of risk as the road width broadens. The controller 50 calculates a correction value RPenv based on the road width and the initial risk potential RP calculated using (equation 5) described above.

A relationship between the road width and the correction value RPenv is shown in FIG. 10A, and a relationship between the initial risk potential RPoriginal and the correction value PRenv corresponding to FIG. 10A is shown in FIG. 10B. As shown in FIG. 10A and FIG. 10B, the correction value RPenv when the road width is medium, for example, when the road width is 3.5 m, is taken to be 0. The correction value RPenv is then made larger as the road width becomes narrow with respect to this medium width, and the correction value RPenv is made to be smaller as the road width becomes broader. Further, the correction value RPenv becomes larger in cases where the road width is narrow as the initial risk potential RPoriginal becomes larger, whereas the correction value RPenv becomes smaller in case where the road width is broad as the initial risk potential RPoriginal becomes larger.

The correction value RPenv changes continuously within the range $-1 \leq$ RPenv $\leq +1$ according to the road width and the initial risk potential RPoriginal. For example, when the road width is narrow at 2.5 m or less, and the initial risk potential RPoriginal is large (for example, RPoriginal$\geq$2), the correction value RPenv=+1, while on the other hand, when the road width is broad at 4.5 m or more, and the initial risk potential RPoriginal is large, then the correction value RPenv=−1.

The controller 50 calculates risk potential RP with respect to the preceding vehicle based on the correction value RPenv calculated according to changes in the environment, i.e. according to road width, and the initial risk potential RPoriginal using (equation 6).

As described above in the third embodiment, the following operational effects are also obtained in addition to the results for the first embodiment described above.

(1) The environment change detection device 30 detects the road width of the vehicle lane as changes in the environment. The risk felt by the driver changes according to the road width of the road the vehicle is traveling on. It is therefore possible to calculate the risk potential RP in line with the risk felt by the driver by correcting the equation for calculating risk potential RP according to the road width.

(2) The controller 50 calculates the correction value RPenv based on the road width detected by the environment change detection device 30 and corrects the equation for calculating the risk potential RP by adding the calculated correction value RPenv. It is therefore possible to calculate risk potential RP that is much closer to the risk felt by the driver by adding a correction value RPenv corresponding to the subjectivity of the driver to the initial risk potential RPoriginal calculated from the traveling conditions, such as the relative positional relationship with the preceding vehicle, etc.

(3) As shown in FIG. 10B, the correction value RPenv changes according to the initial risk potential RPoriginal and is always set to be smaller than the initial risk potential RPoriginal. As a result, it is straightforward for the driver to understand what is taken as the main target in calculating the risk potential RP.

Fourth Embodiment

The following is a description of a driving assist system for vehicle of a fourth embodiment of the present invention. The configuration for the driving assist system for vehicle of the fourth embodiment is the same as for the first embodiment shown in FIG. 1 and FIG. 2. Description here will mainly focus on points of difference from the first embodiment.

In the fourth embodiment, the presence or absence of a neighboring lane is detected as the traveling conditions in order to estimate change in risk felt by the driver. Here, the environment change detection device 30 detects the presence or absence of a lane next to the vehicle lane on which the subject vehicle is traveling by using roadmap information obtained from, for example, a navigation system or by subjecting images for the region in front of the vehicle obtained by the front camera to image processing. In the event that a neighboring lane exists, it is predicted that the driver will feel higher risk because of the possibility of pulling in of other vehicles from the neighboring lane. In the event that there are neighboring vehicle lanes on both sides of the vehicle lane, it is possible that other vehicles may attempt to pull in from both sides of the vehicle lane. Therefore, it can be estimated that the driver will feel greater risk compared with the case where there is a neighboring vehicle lane only on one side of the vehicle lone. The controller 50 calculates a correction value RPenv based on the presence or absence of a neighboring lane and the initial risk potential RPoriginal calculated using (equation 5) described above.

A relationship between the presence or absence of a neighboring vehicle lane and the correction value RPenv is shown in FIG. 11A, and a relationship between the initial risk potential RPoriginal and the correction value PRenv corresponding to FIG. 10A is shown in FIG. 11B. As shown in FIG. 11A, the correction value RPenv is taken to be zero when there is no neighboring vehicle lane, and the correction value RPenv is made larger in phases when a neighboring vehicle lane exists on one side of the vehicle lane and when neighboring vehicle lanes exist on both sides of the vehicle. Further, when a neighboring vehicle lane is present on one or both sides of the vehicle lane, the correction value RPenv is made respectively larger as the initial risk potential RPoriginal becomes larger. Here, the maximum value of the correction value RPenv is set to be small compared to the case where, for example, the illumination state of the brake lamps or the road width is taken as a parameter, as described above (for example, $0 \leq RPenv \leq 0.5$).

The controller 50 calculates risk potential RP with respect to the preceding vehicle based on the correction value RPenv calculated according to changes in the environment, i.e. according to the presence or absence of a neighboring lane, and the initial risk potential RPoriginal using (equation 6).

As described above in the fourth embodiment, the following operational effects are also obtained in addition to the results for the first embodiment described above.

(1) The environment change detection device 30 detects the presence or absence of a neighboring vehicle lane next to the vehicle lane as changes in the environment. In the event that a neighboring lane exists, it is assumed that the driver will feel greater risk because of the possibility of pulling in etc. of other vehicles from the neighboring lane. Further, a higher risk is felt by the driver when the number of neighboring lanes is high, specifically, the likelihood of another vehicle cutting in is higher in the case of neighboring vehicle lanes existing on both sides than in the case of a neighboring vehicle lane being present on just one side of the vehicle lane. It is therefore possible to calculate the risk potential RP in line with the risk felt by the driver by correcting the calculation equation for the risk potential RP according to the presence or absence of a neighboring lane.

(2) The controller 50 calculates the correction value RPenv based on the presence or absence of a neighboring vehicle lane detected by the environment change detection device 30 and corrects the equation for calculating the risk potential RP by adding the calculated correction value RPenv. It is therefore possible to calculate risk potential RP that is much closer to the risk felt by the driver by adding a correction value RPenv corresponding to the subjectivity of the driver to the initial risk potential RPoriginal calculated from the traveling conditions, such as the relative positional relationship with the preceding vehicle, etc.

(3) As shown in FIG. 11B, the correction value RPenv changes according to the initial risk potential RPoriginal and is always set to be smaller than the initial risk potential RPoriginal. As a result, it is straightforward for the driver to understand what is taken as the main target in calculating the risk potential RP.

Fifth Embodiment

The following is a description of a driving assist system for vehicle of a fifth embodiment of the present invention. The configuration for the driving assist system for vehicle of the fifth embodiment is the same as for the first embodiment shown in FIG. 1 and FIG. 2. Description here will mainly focus on points of difference from the first embodiment.

In the fifth embodiment, the distance from the current position of the vehicle to a branching/merging point is detected as the traveling conditions in order to estimate change in risk felt by the driver. The environment change detection device 30 detects branching/merging points such as, for example, highway interchanges, slip roads in and out of service areas, junctions, or intersections of normal roads from, for example, road map information of a navigation system, and detects a distance from the current position of the subject vehicle to the detected branching/merging point. As the frequency of other vehicles changing lanes increases in the vicinity of a branching/merging point, it is assumed that the risk felt by the driver increases as the subject vehicle approaches the branching/merging point. The controller 50 calculates a correction value RPenv based on the distance to the branching/merging point and the initial risk potential RPoriginal calculated using (equation 5) described above.

A relationship between the distance from a vehicle to a branching/merging point and the correction value RPenv is shown in FIG. 12A, and a relationship between the risk potential RPoriginal and the correction value RPenv corresponding to FIG. 12A is shown in FIG. 12B. As shown in FIG. 12A and FIG. 12B, when the distance to the branching/merging point is long at, for example, 500 m or more, the correction value RPenv is taken to be zero. The correction value RPenv is then made larger as the distance to the branching/merging point becomes smaller. In addition, the correction value RPenv is made larger as the initial risk potential RPoriginal becomes larger. In the case where the initial risk potential RPoriginal is large (for example, $RPoriginal \geq 1.2$), the correction value RPenv is set to a maximum value when the distance to the branching/merging point is small at, for example, 200 m or less. Here, the maximum value of the correction value RPenv is set to be a small value compared to the case where, for example, the illumination state of the brake lamps or the road width is taken as a parameter (for example, $0 \leq RPenv \leq 0.5$)

The controller 50 calculates risk potential RP with respect to the preceding vehicle based on the correction value RPenv calculated according to changes in the environment, i.e. according to the distance to a branching/merging point, and the initial risk potential RPoriginal using (equation 6).

As described above in the fifth embodiment, the following operational effects are also obtained in addition to the results for the first embodiment described above.

(1) The environment change detection device 30 detects the distance to the branching/merging point as changes in the environment. At the location where roads branches from/merges into, the risk felt by the driver is high because it is estimated that the frequency of other vehicles changing lanes at the branching/merging point is high. It is therefore possible to calculate the risk potential RP in line with the risk felt by the driver by correcting the calculation equation for the risk potential RP according to the distance to the branching/merging point.

(2) The controller 50 calculates the correction value RPenv based on the distance to the branching/merging point detected by the environment change detection device 30 and corrects the equation for calculating the risk potential RP by adding the calculated correction value RPenv. It is therefore possible to calculate risk potential RP that is much closer to the risk actually felt by the driver by adding a correction value RPenv corresponding to the subjectivity of the driver to the initial risk potential RPoriginal calculated from the traveling conditions, such as the relative positional relationship with the preceding vehicle, etc.

(3) As shown in FIG. 12B, the correction value RPenv changes according to the initial risk potential RPoriginal and is always set to be smaller than the initial risk potential RPoriginal. As a result, it is straightforward for the driver to understand what is taken as the main target in calculating the risk potential RP.

Sixth Embodiment

The following is a description of a driving assist system for vehicle of a sixth embodiment of the present invention. The configuration for the driving assist system for vehicle of the sixth embodiment is the same as for the first embodiment shown in FIG. 1 and FIG. 2. Description here will mainly focus on points of difference from the first embodiment.

In the sixth embodiment, the type of the leading vehicle is detected as the traveling conditions in order to estimate change in risk felt by the driver. Here, the environment change detection device 30 detects whether the preceding vehicle is a normal passenger car, freight truck, or large freight vehicle by subjecting, for example, images for the region to the front of the vehicle acquired by the front camera to image processing. When the preceding vehicle is a large-type vehicle, it is assumed that the risk felt by the driver is high because it is difficult for the driver to understand the traffic conditions to the front of the preceding vehicle. The controller 50 calculates a correction value RP based on the preceding vehicle type and the initial risk potential RP calculated using (equation 5) described above.

Figure 13B:
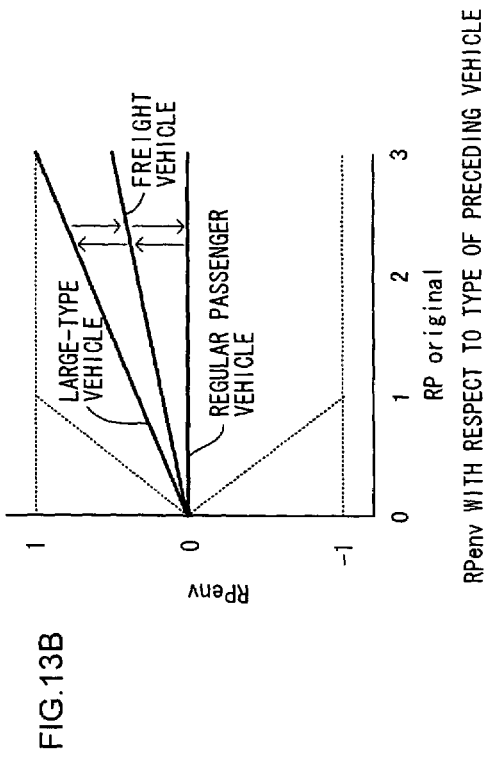
FIG. 13B is a view showing a relationship between an initial risk potential and a correction value.
Figure 13A:
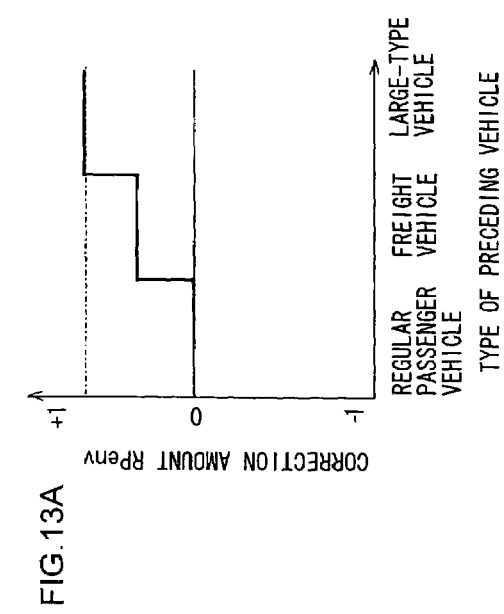
FIG. 13A is a view showing a relationship between a preceding vehicle type and a correction value.

A relationship between the preceding vehicle type and the correction value RPenv is shown in FIG. 13A, and a relationship between the initial risk potential RPoriginal and the correction value PRenv corresponding to FIG. 13A is shown in FIG. 13B. As shown in FIG. 13A and FIG. 13B, the correction value RPenv for the case where the preceding vehicle is a normal passenger vehicle is 0, and when the preceding vehicle is a freight vehicle, and furthermore when the preceding vehicle is a large-type vehicle, the correction value RPenv is taken to be larger in stages. Further, when the preceding vehicle is a freight vehicle or a large-type vehicle, the correction value RPenv becomes respectively larger as the initial risk potential RPoriginal becomes larger. Here, the correction value RPenv is changed between a range of $0 \leq RPenv \leq 1$.

The controller 50 calculates risk potential RP with respect to the preceding vehicle from (equation 6) based on the correction value RPenv calculated according to changes in the environment, i.e. according to the type of the leading vehicle, and the initial risk potential RPoriginal.

As described above in the sixth embodiment, the following operational effects are also obtained in addition to the results for the first embodiment described above.

(1) The environment change detection device 30 detects the type of the preceding vehicle as changes in the environment. When the preceding vehicle is a large-type vehicle, the risk felt by the driver is high because it is difficult for the driver to monitor the traffic conditions to the front of the preceding vehicle. It is therefore possible to calculate the risk potential RP in line with the risk felt by the driver by correcting the calculation equation for the risk potential RP according to the type of the preceding vehicle.

(2) The controller 50 calculates the correction value RPenv based on the type of the preceding vehicle detected by the environment change detection device 30 and corrects the equation for calculating the risk potential RP by adding the calculated correction value RPenv. It is therefore possible to calculate risk potential RP that is much closer to the risk actually felt by the driver by adding a correction value RPenv corresponding to the subjectivity of the driver to the initial risk potential RPoriginal calculated from the traveling conditions, such as the relative positional relationship with the preceding vehicle, etc.

(3) As shown in FIG. 13B, the correction value RPenv changes according to the initial risk potential RPoriginal and is always set to be smaller than the initial risk potential RPoriginal. As a result, it is straightforward for the driver to understand what is taken as the main target in calculating the risk potential RP.

Seventh Embodiment

The following is a description of a driving assist system for vehicle of a seventh embodiment of the present invention. The configuration for the driving assist system for vehicle of the seventh embodiment is the same as for the first embodiment shown in FIG. 1 and FIG. 2. Description here will mainly focus on points of difference from the first embodiment.

In the seventh embodiment, the road gradient is detected as the traveling conditions in order to estimate change in risk felt by the driver. Here, the environment change detection device 30 detects the road gradient from, for example, geographical information obtained by the navigation system. Alternatively, the road gradient can be estimated from the vehicle acceleration detected by an acceleration sensor or engine torque.

When the vehicle approaches a slope, as the vehicle speed fluctuates according to the road gradient, the driver operates the accelerator pedal 80 and adjusts the vehicle speed so as to follow the preceding vehicle while maintaining an inter-vehicle distance that is the same as for a flat road. For example, when the vehicle is going uphill, the driver maintains a fixed inter-vehicle distance with the preceding vehicle by increasing depression of the accelerator pedal 80. At this time, reaction force generated at the accelerator pedal 80 is large compared with a flat road due to increase in the accelerator pedal operation amount even though the risk felt by the driver is the same for the same distance between the subject vehicle and the preceding vehicle.

On the other hand, when the vehicle is advancing downhill, the driver eases off the accelerator pedal 80 to maintain a fixed distance between the vehicles, and only a comparatively small reaction force is generated at the accelerator pedal 80 compared with a flat road. Here, in the seventh embodiment, the risk potential RP is corrected in such a manner as to transmit risk potential RP with respect to the preceding vehicle to the driver as accelerator pedal reaction force regardless of the road gradient. Namely, the risk potential RP is corrected in such a manner as to cause a fixed accelerator pedal reaction force to be generated regardless of road inclination in case where there is no change in the risk felt by the driver with respect to the preceding vehicle. In this way, in the seventh embodiment, changes in the risk felt by the driver due to environmental changes can be said to be changes in feeling of risk with respect to accelerator pedal reaction force changing according to road inclination.

The controller 50 calculates a correction value RPenv based on the road inclination and the initial risk potential RP calculated using (equation 5) described above.

Figure 14B:
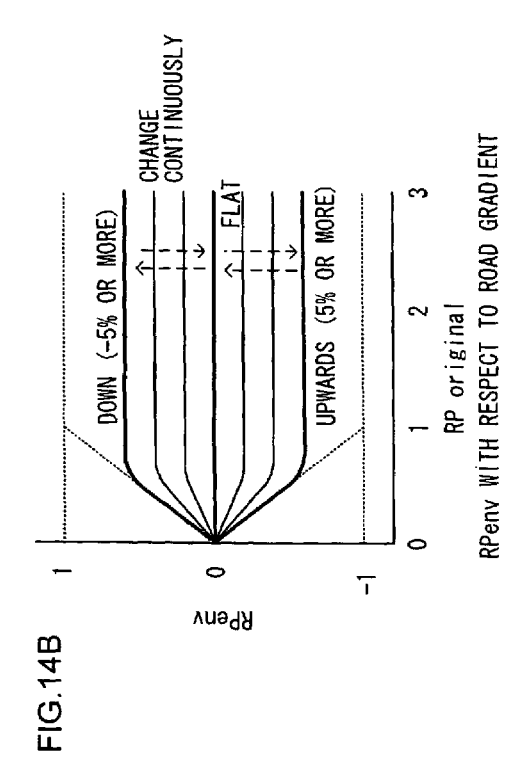
FIG. 14B is a view showing a relationship between an initial risk potential and a correction value.
Figure 14A:
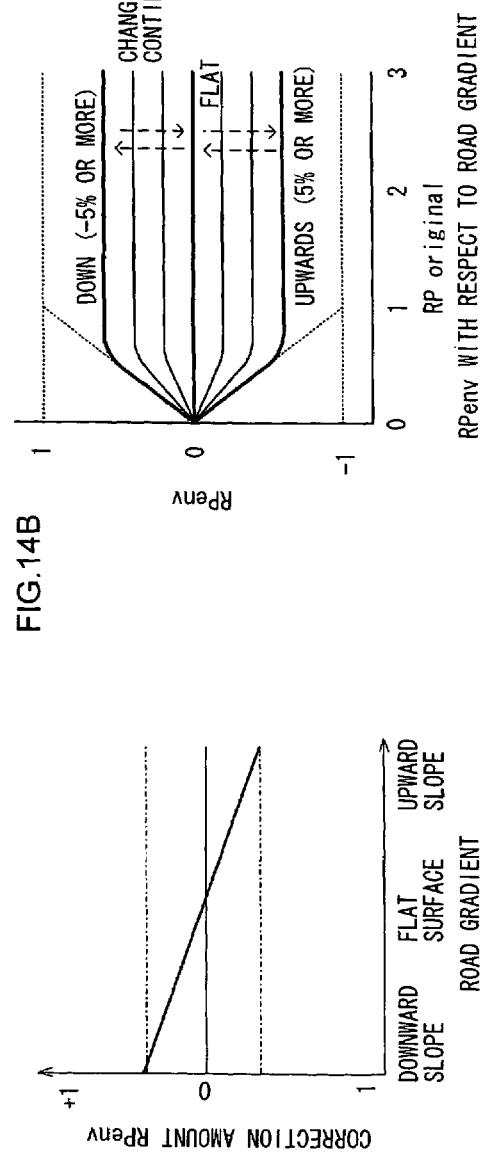
FIG. 14A is a view showing a relationship between a road inclination and a correction value.

A relationship between the road inclination and the correction value RPenv is shown in FIG. 14A, and a relationship between the initial risk potential RPoriginal and the correction value PRenv corresponding to FIG. 14A is shown in FIG. 14B. As shown in FIG. 14A and FIG. 14B, the correction value PRenv when the vehicle lane is a flat road is taken to be zero. The correction value RPenv becomes smaller as the gradient going uphill becomes more severe, and the correction value RPenv becomes larger as the gradient going downhill becomes more severe. Further, in the case of going uphill, the correction value RPenv is made to be smaller as the initial risk potential RPoriginal becomes larger, while conversely, the correction value RPenv is made larger as the initial risk potential RPoriginal becomes larger. When the uphill gradient is, for example, 5% or more, and the initial risk potential RPoriginal is large (for example, RPoriginal≦0.8), the correction value RPenv is taken to be a minimum value, and when the downhill gradient is, for example, −5% or more, and the initial risk potential RPoriginal is large, the correction value PRenv is taken to be a maximum value. Here, the maximum value and the minimum value of the correction value RPenv are set to be small compared to the case where, for example, the road width is taken as a parameter (for example, −0.6≦RPenv≦0.6).

The controller 50 calculates risk potential RP with respect to the preceding vehicle based on the correction value RPenv calculated according to changes in the environment, i.e. according to road gradient, and the initial risk potential RPoriginal using (equation 6).

As described above in the seventh embodiment, the following operational effects are also obtained in addition to the results for the first embodiment described above.

(1) The environment change detection device 30 detects the road gradient as changes in the environment. When a vehicle is advancing along a slope, it is necessary for the driver to adjust the extent to which the accelerator pedal 80 is depressed in order to travel so as to follow the preceding vehicle while maintaining the same inter-vehicle distance as when traveling on a flat road. By correcting the equation for calculating the risk potential according to a road gradient it is possible for the risk felt by the driver from the traveling environment of the surroundings such as the distance to the preceding vehicle etc. and the risk transmitted to the driver as the acceleration pedal reaction force F to agree.

(2) The controller 50 calculates the correction value RPenv based on the road gradient detected by the environment change detection device 30 and corrects the equation for calculating the risk potential RP by adding the calculated correction value RPenv. As a result, it is possible to carry out accelerator pedal reaction force control corresponding to the risk potential RP in line with the risk felt by the driver.

(3) As shown in FIG. 14B, the correction value RPenv changes according to the initial risk potential RPoriginal and is always set to be smaller than the initial risk potential RPoriginal. As a result, it is straightforward for the driver to understand what is taken as the main target in calculating the risk potential RP.

Eighth Embodiment

The following is a description of a driving assist system for vehicle of an eighth embodiment of the present invention. The configuration for the driving assist system for vehicle of the eighth embodiment is the same as for the first embodiment shown in FIG. 1 and FIG. 2. Description here will mainly focus on points of difference from the first embodiment.

In the eighth embodiment, the weather is detected as the traveling conditions in order to estimate change in risk felt by the driver. Here, the environment change detection device 30, for example, detects the weather from the operation speed of the wiper. Specifically, the environment change detection device 30 determines that there is no rainfall when the operation of the wipers is halted, that there is light rain when the wiper operation is intermittent, and that there is rain (of an amount heavier than when there is light rain) when the wipers are operating continuously. It is assumed that the risk felt by the driver is greater compared with that of fine weather due to the visibility being poor and the road surface being slippery. The controller 50 calculates a correction value RPenv based on the weather estimated from the wiper operation speed and the initial risk potential RPoriginal calculated using (equation 5) described above.

Figure 15A:
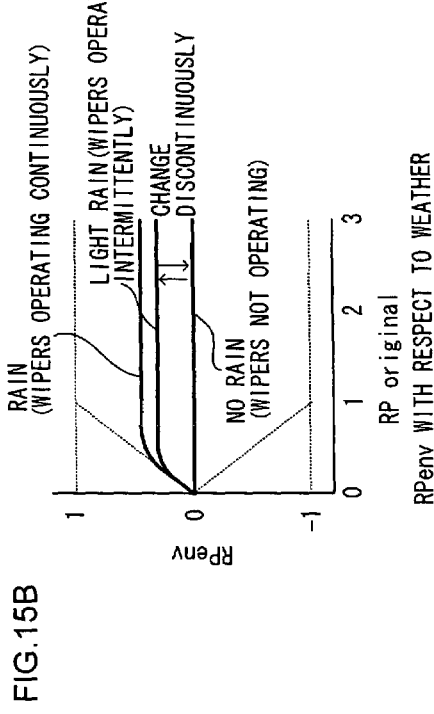
FIG. 15A is a view showing a relationship between weather and a correction value.
Figure 15B:
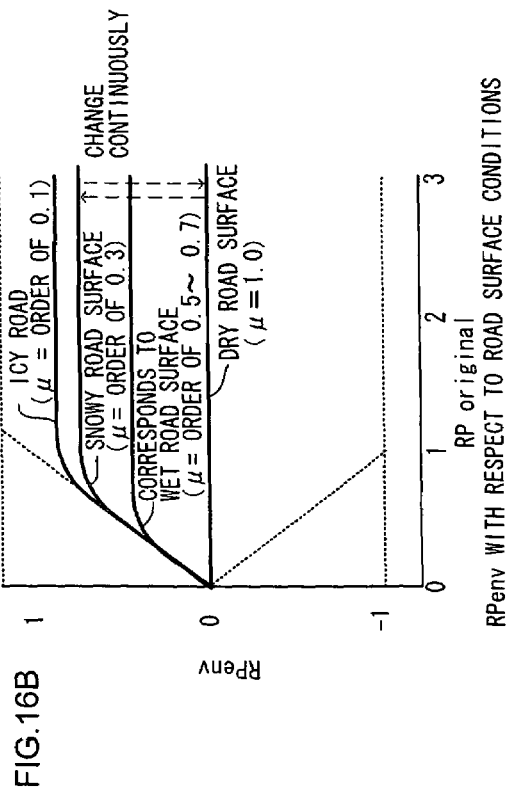
FIG. 15B is a view showing a relationship between an initial risk potential and a correction value.

A relationship between the weather and the correction value RPenv is shown in FIG. 15A, and a relationship between the initial risk potential RPoriginal and the correction value PRenv corresponding to FIG. 15A is shown in FIG. 15B. Here, as shown in FIG. 15A and FIG. 15B, the correction value RPenv when there is no rain is taken to be zero, with the correction value RP being made larger in stages for the cases of light rain (intermittent wiper operation) and cases where the rain is heavier than light rain (continuous operation of the wipers) Further, in the case of light rain or rain, the correction value RPenv becomes respectively larger as the initial risk potential RPoriginal becomes larger. Here, the maximum value of the correction value RPenv is set to be small compared to the case where, for example, the illumination state of the brake lamps described above or the road width is taken as a parameter (for example, 0≦RPenv≦0.4).

The controller 50 calculates risk potential RP with respect to the preceding vehicle based on the correction value RPenv calculated according to changes in the environment, i.e. according to the weather, and the initial risk potential RPoriginal using (equation 6).

As described above in the eighth embodiment, the following operational effects are also obtained in addition to the results for the first embodiment described above.

(1) The environment change detection device 30 detects the weather, and specifically the wiper operation state, as environmental changes. The risk felt by the driver changes according to the weather. It is therefore possible to calculate risk potential RP in line with the risk felt by the driver by correcting the equation for calculating risk potential RP according to the weather.

(2) The controller 50 calculates the correction value RPenv based on the weather detected by the environment change detection device 30 and corrects the equation for calculating the risk potential RP by adding the calculated correction value RPenv. It is therefore possible to calculate risk potential RP that is much closer to the risk felt by the driver by adding a correction value RPenv corresponding to the subjectivity of the driver to the initial risk potential RPoriginal calculated from the traveling conditions, such as the relative positional relationship with the preceding vehicle, etc.

(3) As shown in FIG. 15B, the correction value RPenv changes according to the initial risk potential RPoriginal and is always set to be smaller than the initial risk potential RPoriginal. As a result, it is straightforward for the driver to understand what is taken as the main target in calculating the risk potential RP.

Ninth Embodiment

The following is a description of a driving assist system for vehicle of a ninth embodiment of the present invention. The configuration for the driving assist system for vehicle of the ninth embodiment is the same as for the first embodiment shown in FIG. 1 and FIG. 2. Description here will mainly focus on points of difference from the first embodiment.

In the ninth embodiment, the road surface conditions are detected as the traveling conditions in order to estimate change in risk felt by the driver. Here, the environment change detection device 30 calculates the road surface conditions, i.e. the extent of road surface friction, from, for instance the rotational speed of the wheels and the vehicle speed. For example, in the case of traveling on a snowy road surface that is extremely slippery, it is assumed that the driver feels a great amount of risk. The controller 50 calculates a correction value RPenv based on the extent of road surface friction and the initial risk potential RPoriginal calculated using (equation 5) described above.

Figure 16A:
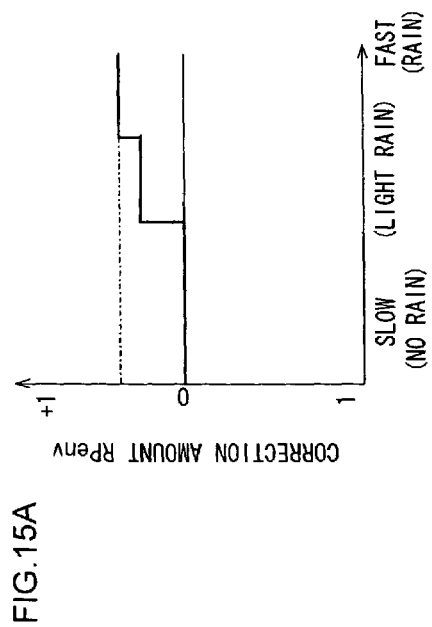
FIG. 16A is a view showing a relationship between an extent of road friction and a correction value.
Figure 16B:
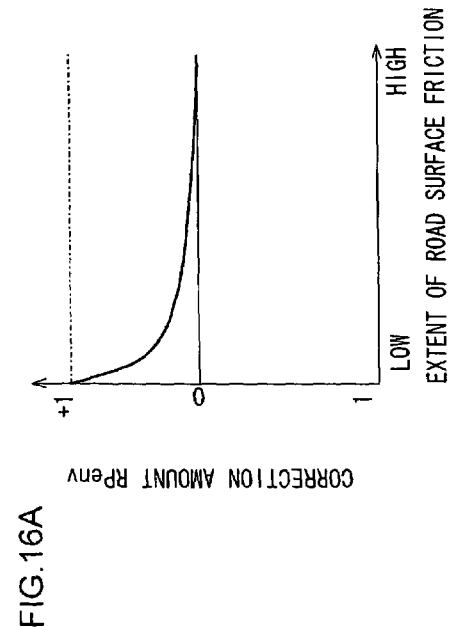
FIG. 16B is a view showing a relationship between an initial risk potential and a correction value.

A relationship between the road surface friction and the correction value RPenv is shown in FIG. 16A, and a relationship between the initial risk potential RPoriginal and the correction value PRenv corresponding to FIG. 10A is shown in FIG. 16B. Here, as shown in FIG. 16A and FIG. 16B, the correction value RPenv is taken to be zero in the case of a dry road surface where the friction of the road surface is high (road surface coefficient of friction μ=1.0). The correction value RPenv is made larger and the rate of increase is made greater as the extent of the road surface friction becomes lower so that the road surface becomes more slippery. The correction value RPenv is made larger as the initial risk potential RPoriginal becomes larger. In cases where the extent of the road surface friction is considerably low (corresponding to μ=0.1, approximately) and the initial risk potential RPoriginal is large (for example, RPoriginal≧1), the correction value RPenv is taken to be a maximum value. Here, the maximum value of the correction value RPenv is set to be small compared to the case where, for example, the illumination state of the brake lamps described above or the road width is taken as a parameter (for example, 0≦RPenv≦0.4).

The controller 50 calculates risk potential RPenv with respect to the preceding vehicle based on the correction value RPenv calculated according to changes in the environment, i.e. according to the extent of road surface friction, and the initial risk potential RPoriginal using (equation 6).

As described above in the ninth embodiment, the following operational effects are also obtained in addition to the results for the first embodiment described above.

(1) The environment change detection device 30 detects road surface friction of the vehicle lane as changes in the environment. The risk felt by the driver changes according to the extent of the road surface friction so that the driver drives carefully on slippery road surfaces. It is therefore possible to calculate the risk potential RP in line with the risk felt by the driver by correcting the calculation equation for the risk potential RP according to the extent of road surface friction.

(2) The controller 50 calculates the correction value RPenv based on the extent of road surface friction detected by the environment change detection device 30 and corrects the equation for calculating the risk potential RP by adding the calculated correction value RPenv. It is therefore possible to calculate risk potential RP that is much closer to the risk felt by the driver by adding a correction value RPenv corresponding to the subjectivity of the driver to the initial risk potential RPoriginal calculated from the traveling conditions, such as the relative positional relationship with the preceding vehicle, etc.

(3) As shown in FIG. 16B, the correction value RPenv changes according to the initial risk potential RPoriginal and is always set to be smaller than the initial risk potential RPoriginal. As a result, it is straightforward for the driver to understand what is taken as the main target in calculating the risk potential RP.

Tenth Embodiment

The following is a description of a driving assist system for vehicle of a tenth embodiment of the present invention. The configuration for the driving assist system for vehicle of the tenth embodiment is the same as for the first embodiment shown in FIG. 1 and FIG. 2. Description here will mainly focus on points of difference from the first embodiment described above.

In the tenth embodiment, correction values RPenv for respective changes in environment are calculated taking traveling conditions detected for extrapolating changes in risk felt by a driver in the first to ninth embodiments as parameters. The largest correction value RPenv is then selected as a typical value from the correction values RPenv thus calculated.

Figure 17:
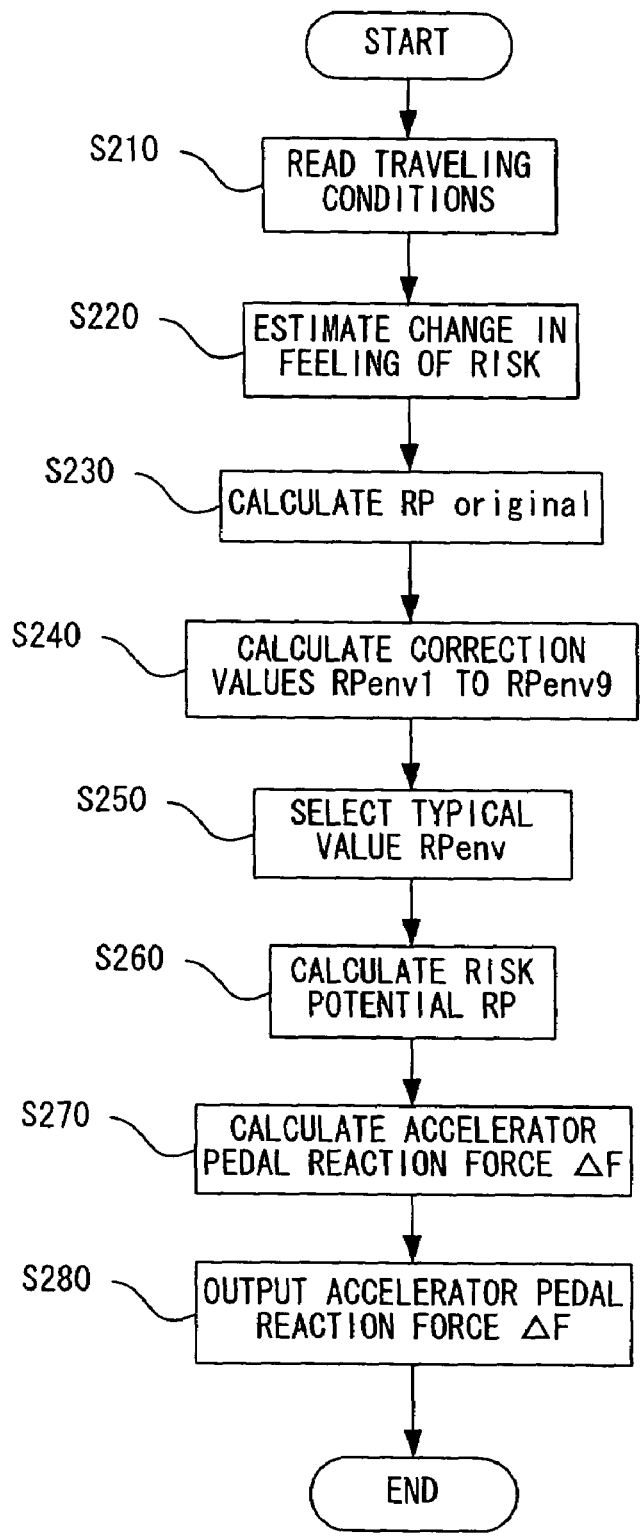
FIG. 17 is flow chart showing a processing sequence for a drive operation assist control program executed in a controller of a tenth embodiment.

The following is a detailed description using FIG. 17 of operations of a driving assist system for vehicle 1 of the tenth embodiment. FIG. 17 is a flowchart showing a processing sequence for a drive operation assist control program in the controller 50. The content of this processing is carried out continuously at fixed intervals (for example, 50 msecs).

In step S210, running conditions of the vehicle and the vehicle surroundings are read in from the laser radar 10 and the vehicle speed sensor 20. In step S220, each of the traveling conditions described above are detected in order to extrapolate changes in risk felt by the driver. Specifically, the following items are detected by the environment change detection device 30.

(1) State of illumination of brake lamps of preceding vehicle.
(2) Traffic flow density.
(3) Road width.
(4) Presence or absence of neighboring lane.
(5) Distance to branching/merging point.
(6) Type of preceding vehicle.
(7) Road gradient.
(8) Weather.
(9) Extent of road surface friction.

In step S230, the steady term RPsteady and the transient term RPtransient are calculated based on the vehicle conditions and the traveling environment, and the initial risk potential RPoriginal is calculated.

In step S240, respective correction values RPenv are calculated according to each of the traveling environments detected in step S220 in accordance with the relationships shown in FIG. 6A and FIG. 6B, and FIG. 9A and FIG. 9B to FIG. 16A and FIG. 16B. Here, correction values RPenv calculated for parameters (1) to (9) for each environmental change are taken to be RPenv1 to RPenv9, respectively. In step S250, the largest value is selected as a typical value RPenv among the correction values RPenv1 to RPenv9 calculated in step S240.

In step S260, risk potential RP is calculated using (equation 6) from the initial risk potential RPoriginal calculated in step S230 and the typical value RPenv selected in step S250. The processing implemented in step S270 and step S280 is the same as the processing in steps S160 and S170 of the flowchart of FIG. 5 described in the first embodiment.

In the tenth embodiment described above, the following operational effects can be achieved.

The controller 50 calculates the correction values RPenv1 to RPenv9 respectively based on the plurality of detected environment change parameters, and corrects the risk potential calculation equation by adding the largest value of the calculated plurality of correction values to the initial risk potential RPoriginal. As a result, it is possible to incorporate the correction value RPenv according to the environment change parameter for which the driver feels the highest risk into the risk potential RP. Further, when the risk felt by the driver due to changes in the environment is substantial, it is possible to generate accelerator pedal reaction force F that is in line with the risk felt by the driver.

In the tenth embodiment, correction values RPenv1 to RPenv9 are calculated for all of the environment change parameters shown in (1) to (9), from which typical values are selected, but the present invention is by no means limited in this respect. For example, correction values RPenv are calculated for a number of parameters of the environment change parameters (1) to (9), and the typical value may then be selected from these values.

Further, environment change parameters other than (1) to (9) described above may be detected, and correction values RPenv may then be calculated according to these other parameters. Namely, the environment change parameters are by no means limited to that described above, and other parameters that cause risk felt by the driver to change may also be employed.

In the first to tenth embodiments, the increase in reaction force dF is set proportionally with respect to the risk potential RP as shown in FIG. 7 but the present invention is by no means limited in this respect, and may also, for example, increase as an exponential function with respect to increases in the risk potential RP.

The above described embodiments are examples, and various modifications can be made without departing from the spirit and scope of the invention.

The disclosure of the following priority application is herein incorporated by reference:

Japanese Patent Application No. 2003-290077 filed Aug. 8, 2003

What is claimed is:

1. A driving assist system for vehicle comprising:
a state recognition device that detects vehicle conditions of a subject vehicle and a traveling environment for vehicle surroundings;
a risk potential calculator that calculates a risk potential for vehicle surroundings based on detection results of the state recognition device;
a risk change estimator that estimates a change in risk felt by a driver;
a correction device that corrects a calculation equation for calculating the risk potential at the risk potential calculator based on estimation results of the risk change estimator; and
an operation reaction force controller that modifies a reaction force applied to vehicle operation equipment based on the risk potential calculated using the calculation equation corrected by the correction device, to convey information related to the risk potential to the driver via the vehicle operation equipment;
wherein the vehicle operation equipment is used by the driver in operating the vehicle.

2. A driving assist system for vehicle according to claim 1, wherein:
the risk change estimator estimates change in the risk felt by the driver due to environmental change.

3. A driving assist system for vehicle according to claim 2, wherein:
the risk change estimator detects a state of illumination of brake lamps of a preceding vehicle as the environmental change, and estimates the change in the risk felt by the driver according to the state of illumination of the brake lamps.

4. A driving assist system for vehicle according to claim 1, wherein:
the correction device corrects the calculation equation for the risk potential by adding a correction value based on the estimation results of the risk change estimator, and
the correction value is smaller than the risk potential calculated by the calculation equation prior to correction.

5. A driving assist system for vehicle according to claim 1, wherein:
the correction device corrects the calculation equation for the risk potential by adding a correction value based on the estimation results of the risk change estimator, and
the correction value is changed according to the risk potential calculated by the calculation equation prior to correction.

6. A driving assist system for vehicle according to claim 2, wherein:
the risk change estimator detects a plurality of environment change parameters, and
the correction device calculates correction values based on detection results for the plurality of environment change parameters of the risk change estimator, and corrects the calculation equation for the risk potential by adding a largest value among a plurality of correction values thus calculated.

7. A driving assist system for vehicle according to claim 2, wherein:
the risk change estimator detects a traffic flow density as the environmental change, and estimates the change in the risk felt by the driver according to the traffic flow density.

8. A driving assist system for vehicle according to claim 2, wherein:
the risk change estimator detects a road width of a vehicle lane as the environmental change, and estimates the change in the risk felt by the driver according to the road width.

9. A driving assist system for vehicle according to claim 2, wherein:
the risk change estimator detects presence or absence of a neighboring vehicle lane as the environmental change, and estimates the change in the risk felt by the driver according to the presence or absence of the neighboring lane.

10. A driving assist system for vehicle according to claim 2, wherein:
the risk change estimator detects a distance from the subject vehicle to a branching/merging point of a vehicle lane as the environmental change, and estimates the change in the risk felt by the driver according to the distance to the branching /merging point.

11. A driving assist system for vehicle according to claim 2, wherein:
the risk change estimator detects a road gradient as the environmental change, and estimates the change in the risk felt by the driver according to the road gradient.

12. A driving assist system for vehicle according to claim 2, wherein:
the risk change estimator detects a type of a preceding vehicle as the environmental change, and estimates the change in the risk felt by the driver according to the type of the preceding vehicle.

13. A driving assist system for vehicle according to claim 2, wherein:
the risk change estimator detects weather as the environmental change, and estimates the change in the risk felt by the driver according to the weather.

14. A driving assist system for vehicle according to claim 2, wherein:
the risk change estimator detects an extent of road surface friction of a vehicle lane as the environmental change, and estimates the change in the risk felt by the driver according to the extent of road surface friction.

15. The system of claim 1, wherein the vehicle operation equipment is an accelerator pedal.

16. A driving assist system for vehicle comprising:
a state recognition means for detecting vehicle conditions of a subject vehicle and a traveling environment for vehicle surroundings;
a risk potential calculation means for calculating a risk potential for vehicle surroundings based on detection results of the state recognition means;
a risk change estimating means for estimating a change in risk felt by a driver;
a correction means for correcting a calculation equation for calculating the risk potential at the risk potential calculation means based on estimation results of the risk change estimating means; and an operation reaction force control means for modiPjing a reaction force applied to vehicle operation equipment based on the risk potential calculated using the calculation equation corrected by the correction means, to convey information related to the risk potential to the driver via the vehicle operation equipment;
wherein the vehicle operation equipment is used by the driver in operating the vehicle.

17. The system of claim 16, wherein the vehicle operation equipment is an accelerator pedal.

18. A vehicle driving assist method comprising:
detecting vehicle conditions of a subject vehicle and a traveling environment for vehicle surroundings;
calculating a risk potential for vehicle surroundings based on the vehicle conditions and the traveling environment thus detected;
estimating a change in risk felt by a driver;
correcting a calculation equation for calculating the risk potential based on the estimated change in the risk felt by the driver; and
modifying a reaction force applied to vehicle operation equipment based on the risk potential calculated using the calculation equation thus corrected, to convey information related to the risk potential to the driver via the vehicle operation equipment;
wherein the vehicle operation equipment is used by the driver in operating the vehicle.

19. The method of claim 18, wherein the vehicle operation equipment is an accelerator pedal.

20. A vehicle comprising:
a driving assist system for vehicle that comprises (a) a state recognition device that detects vehicle conditions of a subject vehicle and a traveling environment for vehicle surroundings; (b) a risk potential calculator that calculates a risk potential for vehicle surroundings based on detection results of the state recognition device; (c) a risk change estimator that estimates a change in risk felt by a driver; (d) a correction device that corrects a calculation equation for calculating the risk potential at the risk potential calculator based on estimation results of the risk change estimator; and (e) an operation reaction force controller that modifies a reaction force applied to vehicle operation equipment based on the risk potential calculated using the calculation equation corrected by the correction device, to convey information related to the risk potential to the driver via the vehicle operation equipment;
wherein the vehicle operation equipment is used by the driver in operating the vehicle.

21. The vehicle of claim 20, wherein the vehicle operation equipment is an accelerator pedal.

* * * * *